US012620324B2

(12) United States Patent　　　　　(10) Patent No.:　　US 12,620,324 B2
Qiu et al.　　　　　　　　　　　　　　(45) Date of Patent:　　May 5, 2026

(54) METHOD OF ASSESSING THE PERFORMANCE OF A HUMAN OR ROBOT CARRYING OUT A MEDICAL PROCEDURE AND ASSESSMENT TOOL

(71) Applicant: MAX-PLANCK-GESELLSCHAFT ZUR FÖRDERUNG DER WISSENSCHAFTEN E.V., Munich (DE)

(72) Inventors: Tian Qiu, Stuttgart (DE); Peer Fischer, Freiburg (DE); Fabian Adams, Freiburg (DE); Arkadiusz Miernik, Freiburg (DE)

(73) Assignee: Max-Planck-Gesellschaft zur Förderung der Wissenschaften e. V., Munich (DE)

( * ) Notice: Subject to any disclaimer, the term of this patent is extended or adjusted under 35 U.S.C. 154(b) by 655 days.

(21) Appl. No.: 16/094,180

(22) PCT Filed: May 23, 2017

(86) PCT No.: PCT/EP2017/062441
　　§ 371 (c)(1),
　　(2) Date: Oct. 16, 2018

(87) PCT Pub. No.: WO2017/207361
　　PCT Pub. Date: Dec. 7, 2017

(65) Prior Publication Data
　　US 2019/0130791 A1　　May 2, 2019

(30) Foreign Application Priority Data

May 30, 2016　　(EP) ..................................... 16172004

(51) Int. Cl.
　　*G09B 23/30*　　　　(2006.01)
　　*G09B 23/28*　　　　(2006.01)

(52) U.S. Cl.
　　CPC ........... *G09B 23/285* (2013.01); *G09B 23/30* (2013.01)

(58) Field of Classification Search
　　CPC .................. G09B 23/30; G09B 23/285; A61B 2017/00707; A61B 2017/00716; A61B 2017/00721
　　See application file for complete search history.

(56) References Cited

U.S. PATENT DOCUMENTS

2004/0126746 A1　　7/2004　Toly
2005/0181342 A1 *　8/2005　Toly ..................... G09B 23/285
　　　　　　　　　　　　　　　　　434/262

(Continued)

FOREIGN PATENT DOCUMENTS

WO　　2008021720 A2　　2/2008
WO　　2011032840 A1　　3/2011

(Continued)

OTHER PUBLICATIONS

Adams, F. et al., "358 Experimental 3D-printed kidney model based on medical imagining data of human cadavers for educational and surgery planning purposes", European Urology Supplements, Mar. 2016, vol. 15, No. 3, 1 page.

(Continued)

*Primary Examiner* — Bruk A Gebremichael

(74) *Attorney, Agent, or Firm* — Dickinson Wright PLLC

(57) ABSTRACT

The present invention relates to method of assessing the performance of a human or robot carrying out a medical (Continued)

Figure 1:
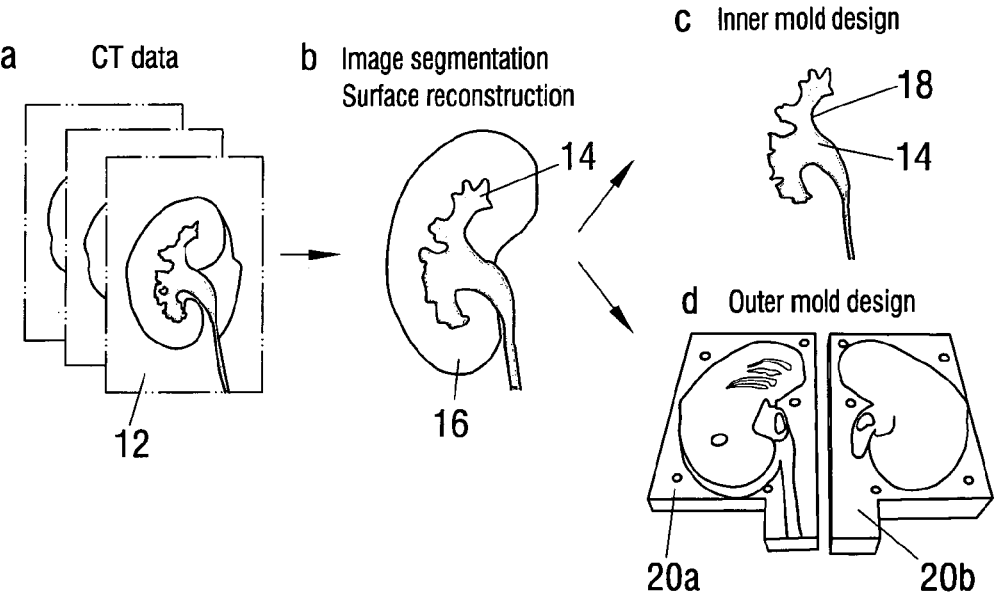

procedure by using a phantom resembling a human or animal organ or tissue and to an assessment tool comprising such a phantom.

14 Claims, 7 Drawing Sheets

(56) References Cited

U.S. PATENT DOCUMENTS

| | | | | |
|---|---|---|---|---|
| 2006/0056580 A1* | 3/2006 | Frangioni | | G01N 23/223 |
| | | | | 378/207 |
| 2013/0157240 A1* | 6/2013 | Hart | | G09B 23/285 |
| | | | | 434/267 |
| 2014/0011173 A1* | 1/2014 | Tepper | | A61B 8/4254 |
| | | | | 434/273 |
| 2014/0306126 A1* | 10/2014 | Betrouni | | G09B 23/30 |
| | | | | 250/492.1 |

FOREIGN PATENT DOCUMENTS

| | | | |
|---|---|---|---|
| WO | 2013076056 A | 5/2013 | |
| WO | 2015003271 A1 | 1/2015 | |

OTHER PUBLICATIONS

De Grand, Alec M. et al., "Tissue-like phantoms for near-infrared fluorencence imaging system assessment and the training of surgeons", Journal of Biomedical Optics, Jan./Feb. 2006, pp. 014007-1-014007-10, vol. 11(1), SPIE, Bellingham, WA, USA.

International Search Report for International Application No. PCT/EP2017/062441 mailed Jul. 20, 2017, 4 pages.

Pacioni, Alessia et al., "Patient-specific ultrasound liver phantom: materials and fabrication method", International Journal of Computer Assisted Radiology and Surgery, Oct. 1, 2014, pp. 1065-1075, vol. 10, No. 7, Springer, DE.

Pleijhuis, R. G. et al., "Near-infrared fluorescence (NIRF) imaging in breast-conserving surgery: Assessing intraoperative techniques in tissue-simulating breast phantoms", European Journal of Surgical Oncology, Jan. 1, 2011, pp. 32-39, vol. 37, No. 1, London, GB.

Shevchenko, N. et al., "Evaluation of a Resectable Ultrasound Liver Phantom for Testing of Surgical Navigation Systems", 33rd Annual International Conference of the IEEE EMBS, Aug. 30-Sep. 3, 2011, pp. 916-919, Boston, MA, USA.

Written Opinion for International Application No. PCT/EP2017/062441 mailed Jul. 20, 2017, 6 pages.

European Communication Pursuant to Article 94(3) issued on Nov. 22, 2021 for counterpart European Patent Application No. 17724394.6 (Four Pages).

* cited by examiner a   CT data b  Image segmentation
Surface reconstruction c  Inner mold design d  Outer mold design a  3D Printet inner mold b  3D Printet outer molds c  Assembly of molds d  Polymer molding e Removal of molds f Kidney phantom

Fig.3 a  front side   back side

Figures 3, 4:
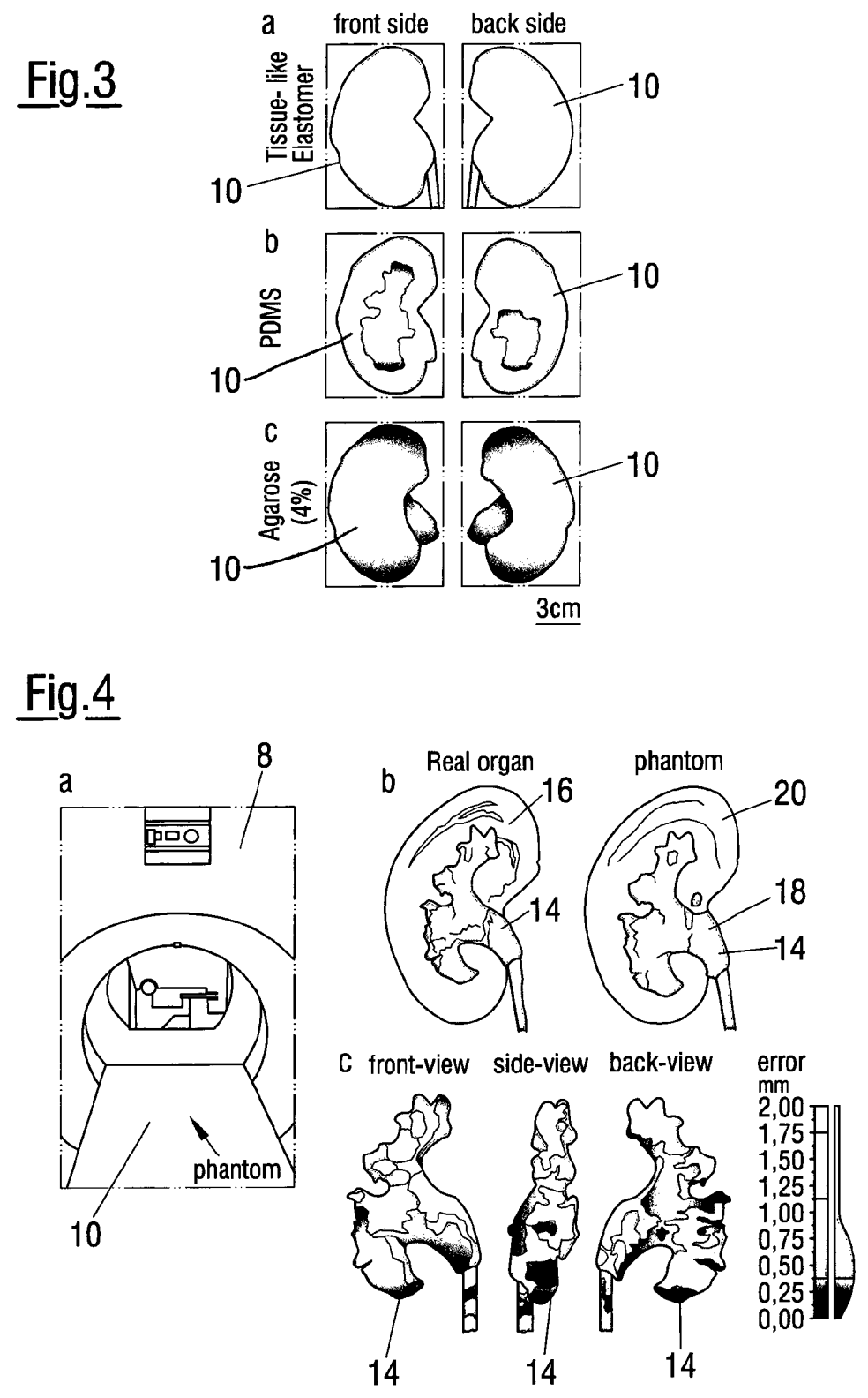

Tissue-like Elastomer

10

10 b

PDMS

10

10 c

Agarose (4%)

10

10

3cm

Fig.4 a

8 phantom

10 b  Real organ        phantom

16

20

18

14

14 c  front-view   side-view   back-view   error mm 2,00
1,75
1,50
1,25
1,00
0,75
0,50
0,25
0,00

14        14        14

(a)                    (b)                    (c)

Fig.9
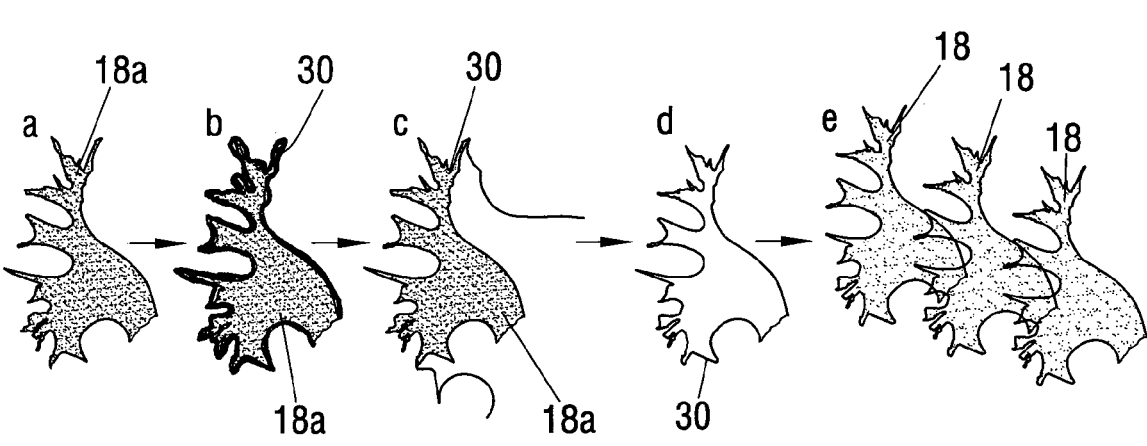
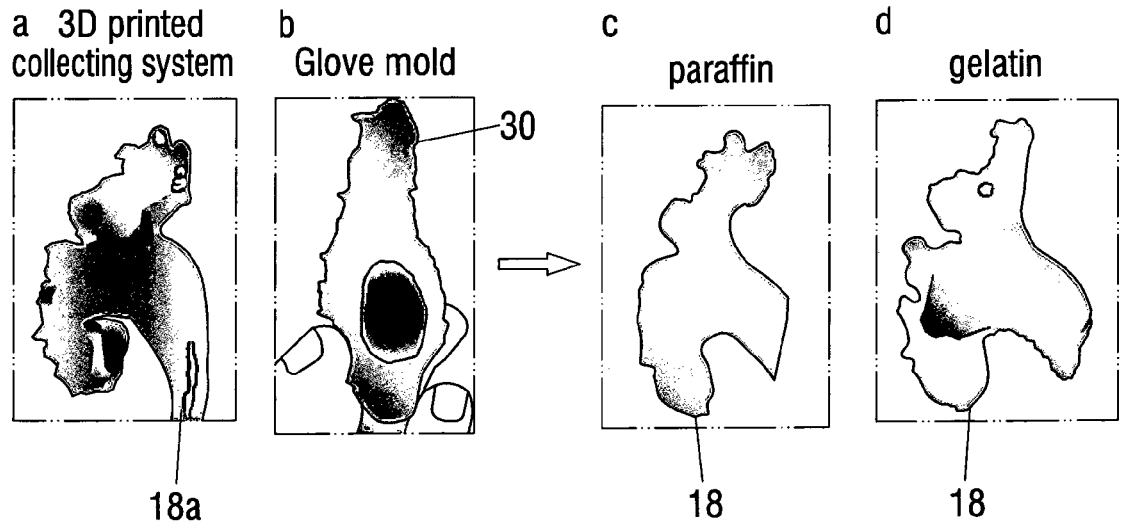
Fig.10

D
C
B
A

26

B
A

10

14

D
C
B
A

26 Tumor

Bladder

10

Prostate bladder wall instrument
field of view instrument

10

24 pressure disconnection leakage

10

14

32 pressure suture no leakage

14

10

34    32

METHOD OF ASSESSING THE PERFORMANCE OF A HUMAN OR ROBOT CARRYING OUT A MEDICAL PROCEDURE AND ASSESSMENT TOOL

CROSS-REFERENCES TO RELATED APPLICATIONS

This application is a 371 National Phase Application of Patent Application PCT/EP2017/062441, filed on May 23, 2017, which claims the priority of European Application No. 16172004.0 filed on May 30, 2016, each of which is incorporated herein by reference, in its entirety.

The present invention relates to a method of assessing the performance of a human or robot carrying out a medical procedure by using a phantom resembling a human or animal organ or tissue and to an assessment tool for assessing the performance of a human or a robot carrying out a simulated medical procedure on a phantom.

Medical training aids are known that can be used in the training of medical personnel. These training aids typically have an outer shape that resembles that of the concerned body part. These training aids are frequently not produced with a high degree of anatomical correctness, so that e.g. for radiological training purposes, e.g. calyces in a kidney cannot readily be identified therefrom, as these are either not present or the structures present in the training aid are too large so that one cannot carry out a differentiation at the scale normally associated with these structures in a real organ.

Moreover, these training aids are frequently not made from a material that permit a surgeon to obtain a correct feel of the organ as e.g. the elastic modulus of the materials used to make these phantoms differs from that of the real organ, such that their use in surgical training is limited.

It should also be noted that these training aids have hitherto been very expensive and so their use has so far been limited to medical specialists, due to their limited resolution very specific kinds of medical procedures are frequently not conducted using such phantoms due to the differences present between the phantoms and the real organs.

For this reason it is an object of the present invention to provide an improved training aid by means of which an improved surgical or diagnostic training is made possible. It is a further object of the invention to provide a training aid by means of which improved feedback can be given on the medical procedure conducted with the training aid. It is yet a further object to provide a low cost surgical training aid that can be produced with a so far unknown anatomical correctness. It is yet a further object of the present invention to provide a surgical phantom that responds in a way similar to the real organ.

These objects are respectively satisfied by a method of assessing the performance of a human or robot carrying out a medical procedure by using a phantom resembling a human or animal organ or tissue and by an assessment tool for assessing the performance of a human or a robot carrying out a simulated medical procedure on a phantom An assessment tool for assessing the performance of a human or a robot carrying out a simulated medical procedure on a phantom, in accordance with the invention has the phantom, with the phantom comprising artificial tissue having at least one property that resembles at least one property of the human or animal tissue, with said artificial tissue comprising at least first and second regions, wherein said second region has at least one characteristic that is different from a characteristic of the first region, the tool including a visualization aid permitting the simulated medical procedure to be visualized to carry out the assessment, with said second region comprising a target region, in particular simulating a tumor, a kidney stone, a bone fragment, a bullet or a bullet or knife wound.

Due to the fact that the phantom comprises artificial tissue having at least one property that resembles at least one property of the human or animal tissue this can be used e.g. for diagnostic purposes as the at least one property is then selected such that the phantom can be diagnosed correctly in a medical imaging device.

In this connection it is advantageous if the material that has the at least one tissue like property is selected such that the at least one tissue like property reproduces at least one of a mechanical property, an imaging contrast in MRI, CT, X-ray or Ultrasound, an optical property, a visual appearance, a tissue's or organ's absorbance of electromagnetic radiation, a tissue's or organ's absorbance of acoustic waves, a haptic property of the tissue or organ, and an elastic modulus of the corresponding tissue found in the organ.

It is also possible to embed a second structure in the phantom in order to replicate e.g. a tumor in the target region. Similar material properties can also be selected for the second structure that is embedded into the phantom if this is to be e.g. a tumor. Thus, a material used for the second structure has at least one property that reproduces at least one of a mechanical property, an imaging contrast in MRI, CT, X-ray or Ultrasound, an optical property, a visual appearance, a tissue's or organ's absorbance of electromagnetic radiation, a tissue's or organ's absorbance of acoustic waves, a haptic property of the tissue or organ, and an elastic modulus of the corresponding tissue or defect, e.g. tumor, found in the organ.

By including at least one material or mixtures of material that comprise at least some of these properties, the properties of the phantom can be tailored to the specific application of the assessment tool.

For example, the target region and/or the phantom can be provided with a specific contrast agent and/or be made from a material that can be visualized particularly well using medical imaging devices in such a way that the assessment tool can be used in assessing the performance of a test subject conducting a diagnostic procedure.

Alternatively the assessment tool can comprise a phantom that is suitable for surgical training purposes, in this instance the tissue like property is selected such that the phantom has properties that resemble those of a real organ, like its touch and feel to a scalpel, e.g. its elastic properties.

Providing the phantom with a target region, e.g. a second region with at least one characteristic that is different from a characteristic of the first region means that this difference can be visualized and this difference can then also be used for the assessment of the target region of the phantom.

In this way a target region that e.g. simulates a tumor, a kidney stone, a bone fragment, a bullet or a bullet or knife wound in the phantom can be diagnosed using a medical imaging device. Alternatively a surgical procedure carried out to remove the target region can be assessed on the basis of the visualization, e.g. by doping the target region with a material that can be visualized, for example, through the use of UV light.

Advantageously the method comprises the further step of providing the phantom with a third region simulating a transient region in between the first and second regions. The assessment is then carried out by analyzing an amount of tissue removed from and/or left in the phantom, in particular by measuring how much volume and/or weight of the second and third regions remain present within the first region; and/or by measuring how much volume and/or weight of the second and third regions are removed.

Alternatively the assessment is carried out by analyzing the size and/or position and/or intensity of the third region.

This transient region or third region respectively then replicates a transition zone that may exist in a real organ that is part tumorous and part normal tissue. Having regard to an ideal surgical intervention this complete transition zone is also removed during surgery.

In this connection it should be noted that the second and first regions are not typically in contact with one another but are separated from one another via the third region.

Moreover, such assessment steps can be conducted to see if the surgical procedure and/or diagnostic procedure has been carried out to the expected level.

Preferably the second region has at least one different material property in comparison to the first and third regions, with the at least one different material property of the second region being detectable by a person or robot conducting the medical procedure, namely a surgical procedure, with this at least one different material property being selected from the group of members consisting of a visual property of the texture, a color, an elasticity, a heat conductivity, a roughness, a haptic feeling and combinations thereof, wherein the second and third regions preferably have at least one further different material property in comparison to the first region such that this difference in the at least one further different material property can be visually inspected, e.g. by at least one medical imaging method.

Such properties can be perceived by a person or robot conducting the medical procedure. Moreover, they can be visualized e.g. through the use of a black light or through the application of phosphorescent material.

Advantageously the scoring system for the surgical assessment can then be established such that it is based on the measured volume and/or weight of the second and third regions.

By using a scoring system the performance of a group of persons or robots can be analyzed as a whole by e.g. comparing the scores respectively achieved. The scoring system can include separate scores for the removal of the second and third regions, for example. In order to do this respective regions of removal or diagnosis can be defined and the scoring rule is adjusted due to the target region that is to be diagnosed or surgically approached.

For example, one can obtain points for the partial removal of the second region, further points for the complete removal of the second region, further points for the partial removal of the third region, further points for the complete removal of the third region and further points if none of the first region is removed or if as little as possible of the first region is removed.

In this connection it is also possible to provide the phantom with a fourth region, with the fourth region resembling another anatomical structure. In this respect the fourth region can be a cavity, e.g. a urethra, a fluid collecting system, a blood vessel, a GI tract, and/or an air lumen.

Generally speaking the phantom can be made of soft elastomeric materials, since these replicate the features of a real organ in a desirable way.

It should further be noted that the assessment need not necessarily be the removal of a complete tumor or the like, but rather be the performance of a robot or a person conducting a biopsy of the relevant organ. For example, an assessment can then be made whether the person or robot has removed material from one of the first, second or third regions, with the removal of material from the second region being a good pass, that of the first region being a clear fail and the removal of material from the third region being one of a marginal fail or a marginal pass, for example.

Advantageously the assessment tool further comprises a recording device for recording the visualization of the simulated medical procedure or a parameter related thereto, in particular the at least one characteristic of the second region that is to be visualized and/or imaged.

In this way an assessment of the procedure carried out using the assessment tool can be recorded to ensure that the same standard of assessment is conducted. Recording the surgery also provides a surgeon with feedback on how he could alternatively conduct a real life surgery.

Preferably the assessment tool further comprises a comparison device for comparing the result of the visualization with a reference standard.

Providing a reference standard aids in the assessment of the medical personnel or robot. For diagnostic purposes the reference standard can be the exact position and/or size of the target region, so that an assessment of the conformity of the diagnosed target region with the reference standard provides feedback on the quality of the diagnosis provided by the person being assessed.

Advantageously the assessment tool is configured to assess the performance of a human or a robot by analyzing changes of the phantom before and after a medical procedure has been carried out, e.g. by tumor removal or e.g. by an analysis of target region in comparison with a reference standard.

In this way a surgical procedure conducted on the phantom can be assessed.

Preferably the assessment tool further comprises a transient region surrounding the target region.

Preferably the at least one property of the tissue and/or the at least one characteristic of the at least first and/or second regions and/or, if provided, a characteristic of the transient region, is/are selected from the group of members consisting of density, elasticity, hardness, stiffness, fiber content, absorbance, scattering of electromagnetic radiation or acoustic waves, the visual appearance thereof, or combinations of the foregoing.

It is preferred if the human or animal phantom is selected from the group of members consisting of:

a kidney phantom, a heart phantom, a brain phantom, a lung phantom, a blood vessel phantom, a liver phantom, a pancreas phantom, a gall bladder phantom, a prostate phantom, a GI tract phantom, a urinary tract phantom, a testicle phantom, a female reproductive tract phantom, a breast phantom, an intestinal phantom, an ear phantom, an eye phantom.

In this regard it should be noted that the phantom resembles a human or animal organ or tissue, and comprises at least one first region having at least one tissue like property and at least one cavity having a plurality of hollow branches connected thereto, with at least some of the plurality of hollow branches being formed such that they project into the first region having tissue like properties.

The cavity having the branches connected thereto can then e.g. mimic a blood vessel or a further structure present in the phantom.

More specifically, the phantom can be obtained by a method of making a phantom comprising the steps of:

making at least a first structure having a shape that resembles the shape of the at least one cavity and of the interior of the plurality of branches connected to the at least one cavity;

placing said first structure in a phantom mold having an inner shape that resembles an outer shape of the phantom;

filling the phantom mold with a material that has the at least one tissue like property to form the phantom;

removing the first structure from the phantom in order to form the one cavity having a plurality of hollow branches connected thereto within the phantom.

It is preferred if the phantom that resembles a human or animal organ or tissue, comprises at least one region having at least one tissue like property and at least a first cavity having a plurality of hollow branches connected thereto, with at least some of the plurality of hollow branches being formed within the at least one region having tissue like properties, wherein the plurality of branches connected to the first cavity are produced with an average root mean square error of less than 2 mm, preferably of less than 1 mm and most preferably of less than 0.6 mm.

Such a phantom comprises internal structures that are formed with a never seen before anatomical correctness. Advantageously the phantom is designed on the basis of data obtained from a CT scanner scanning a real organ and the finished first structure and/or phantom is likewise scanned using a CT scanner, with the image data of the scanned first structure or phantom being compared to the image data used to design the first structure in order to obtain data on the average root mean square error. In this way the limit to the resolution of the first structure is the limit of the resolution of the CT scanner used to scan the real organ and to subsequently design the first structure.

Advantageously the material having the at least one tissue like property is water soluble, e.g. agarose gel, such a phantom has very similar properties to a real organ. This is due to the fact that human or animal organs are mainly composed of water.

For example on the production of a kidney phantom this can comprise a first cavity whose shape corresponds to that of the ureter, the renal pelvis and at least some of the major and minor calyxes connected thereto. The kidney phantom can also comprise cavities that are designed to form the renal vein and the renal artery which then branch off into the interlobular vein and the interlobular artery respectively. The kidney phantom is then provided with a tumor in the region of the tissue-like material.

During the assessment procedure liquids resembling blood and water can be conducted through the various cavities. Part of the assessment can then also be based on whether the medical personnel whose performance is being assessed severs a cavity in which the fluid is conducted and not only on whether sufficient material comprising tumor or too much "healthy" tissue is removed.

A part of the assessment can then also be based on how fast such a severing of a fluid conducting vessel is blocked during the training exercise. This could for example be assessed by analyzing a pressure of the fluid in the system, in particular by measuring the time between a detected loss in pressure and a stop in the loss of pressure.

In this connection it should be noted that it is advantageous if e.g. the tumor material is doped with an agent that indicates the presence of a tumor so that following the training exercise one can analyze whether sufficient tumor material was removed from the phantom.

In this connection it should be noted it is advantageous if the at least one characteristic of the second region is configured to be visualized using UV light, or by means of using phosphorescent materials. These are comparatively cheap and simple materials whose presence can be discovered by simply turning on a black light or by removing any ambient lighting.

The structure forming the tumor can be introduced into the tissue-like material with a transition zone present at the interface between the first and second regions comprising a mixture of the respective materials of the at least first and second regions. Provision could then for example be made that only this transition zone comprises the material that can be visualized as a successful completion of the surgical exercise could be the complete removal of this transition zone of material.

In this way one could see if a test subject, e.g. a person or a machine, cuts away the correct amount of material.

Advantageously the phantom is selected from the group of members consisting of: a model for a human or animal heart, a brain, a lung, a kidney, at least one blood vessel, a liver, a pancreas, a gall bladder, a GI tract, a urinary tract, a testicle, a penis, a female reproductive tract, a breast, a prostate, an ear and an eye.

In a further aspect the method of assessing the performance of a human or robot carrying out a medical procedure by using a phantom resembling a human or animal organ or tissue, comprises the steps of:

providing a first state of the phantom at the start of the medical procedure;

carrying out the medical procedure to transform the phantom from the first state to a second state; and assessing from a comparison of the first state and the second state a performance of the person or robot.

The advantages described in connection with the assessment tool are likewise true having regard to the methods of assessment described herein.

This kind of method could then be used to analyze the surgical skills of a test subject, e.g. on the removal of a tumor from the phantom.

Such a method preferably further includes the step of using a medical imaging device, such as an endoscope, to assist the human or robot while carrying out the simulated medical procedure.

Advantageously the comparison is carried out by preparing the phantom so that material removed or modified by the medical procedure can be visualized and the comparison is carried out by an analysis of the material removed or modified with respect to a material that is left behind in the phantom or with reference to an evaluation standard.

An evaluation standard could then describe the amount of material that has to be removed in order to be deemed a competent surgeon. In this connection it should be noted that removing too much material could then also lead to a performance that is rated sub-standard as the removal of too much material from a real organ can lead to the a loss of the organ's function.

In this connection it should be noted that the material removed or modified by the medical procedure can comprise e.g. the removal of a tumor; the destruction and removal of a lens in cataract surgery; kidney, bladder, or gall stone removal after destruction of the stone. Such steps, where applicable, require that (i) the fragments to do not damage the surrounding tissue and (ii) that the tissue or fragments to be removed are removed as completely as possible.

In this way the phantom can be used to assess the performance and completeness of the destruction and removal of material representing for instance a tumor, a lens, or a stone. The material to be removed is then prepared so that it gives a high imaging contrast compared to the rest of the phantom. This imaging modality is ideally different to the one used by the surgeon during the intervention such that an ideal assessment can take place without the surgeon being aware of what is being assessed. After the intervention the phantom is then examined with this additional high-contrast imaging modality to show any "remaining parts" that have been left in the phantom. The imaging contrast affords the following assessments:

i. have fragments been prevented from entered the surrounding tissue (where they could cause damage) and/or ii. have all fragments or all material been removed in its entirety (where if they are left behind they can cause complications).

Advantageously the target region further comprises an optical pattern, with the optical pattern including information regarding at least one of the position, size and illumination intensity of the target region. In this way the optical pattern can e.g. transmit information to the assessment tool, i.e. the software implemented in the assessment tool, that enables the performance evaluation of the diagnostic procedure on the basis of a comparison of the optical pattern and the diagnostic procedure carried out by the medical professional or robot. Preferably this optical pattern conveys no information to the medical professional or robot including visual clues about the orientation or others related to the target region.

A further assessment parameter can be the completeness (surface area coverage) with which for instance an imaging or inspection has been performed. For instance in bladder cystoscopy (inspection) it is important that, during an endoscopic cystoscopic procedure, the entire inside of a bladder is inspected and that no region is missed, as this could for instance mean that the inspection misses a tumor.

In this event and during other diagnostic procedures the performance of such a procedure can then be evaluated by patterning the inside of the bladder with a suitable optical pattern. The human or robot performing the procedure records images during the procedure. The images carry no meaning and comprise an optical pattern such that they do not provide any visual cues about the orientation to the operator. However, the recorded images can be analyzed using image analysis software and compared to a database holding the inside view of the bladder. The completeness of the inspection can thus be gauged. Other inspection procedures and other organs can also be targeted. The optical pattern can be generated by color difference, intensity difference, and/or surface textures.

In a further preferred method the assessment of the medical intervention can include the total time taken for the critical aspect of the intervention, as a performance and/or assessment parameter. This is because short times for instance mean that less anesthetic is required.

Preferably a scoring system for the surgical assessment can be established on the basis of the comparison using measured physical parameters. Using measured physical parameters as the basis of the comparison makes the assessment more sophisticated and the results of the assessment are more reproducible.

In this way the physical parameters can be selected from the group of members consisting of the time of the procedure, a blood loss, a measurement of volume/weight of material removed, mechanical strength, elasticity, electrical connection, pressure, fluidic flow, and/or proper function of a device or implant.

In this connection it should be noted that the assessment of the medical procedure can be extended to include a form of measurement and testing after the procedure has been carried out, for instance, in the event that the intervention (medical procedure) involves the removal of a section of the intestine. During such a procedure the phantom will be inspected, the section or material will be removed by excising a section or segment from the intestine, then this cut will be sutured, or otherwise repaired, and the quality of the intervention not only entails ensuring that the correct section of the correct size has been removed, but also that the tissue has been repaired and sutured to a desired degree of quality.

Thus, in order to assess the quality of a repair and/or suture following a medical procedure at least one of the following measurements is carried out: a measurement of a mechanical strength of the suture, and a subsequent comparison with a target value; a measurement of the pressure of the phantom after the intervention, possibly by a comparison of pressure before and after, and a comparison with a target value; a measurement of the elasticity of an implant or a connection; a measurement of an electrical connection in case of a simulated neuronal connection; and a test to see if an implant or device embedded during the medical procedure functions correctly.

During the medical intervention a further assessment parameter is for instance blood loss. This can be monitored by pumping a fluid through a suitable material or tubular system. The cutting or rupture of this cavity structure containing a test fluid causes loss of pressure or fluid. The intervention may require the surgeon to suture the vessels or stem the loss of fluid. The amount of fluid lost can thus be quantified. Similarly, the fluid may represent nerves and the fluid thus serves as a means of determining whether nerves have been severed. Similarly, the airwaves, or the lymphatic system may be modeled by cavity structures that are embedded in the phantom and that are connected to a measurement setup that determines volume, flow rate, or pressure and that can be used to indicate cuts, ruptures, or damage, and/or be used to quantify the amount of fluid and/or gas lost. The amount may be representative of a volume of blood, or may indicate a time taken to repair a rupture etc. and is thus a performance parameter that can be used during the intervention.

It is preferred if the material removed or modified by the medical procedure is visualized by at least one of:

incorporating fluorescent material in the phantom, such material being for example visible in darkness;

incorporating material that can be visualized on the application of UV light into the phantom under UV light; and investigating the phantom by ultrasound, by MRI, by CT and/or by X-ray imaging.

These are possible tools and ways of visualizing medical procedures and for this reason could also be used in the assessment of medical personnel.

For example, a contrast agent can be mixed into the polymeric material before this is cured during the molding process, e.g. an iodinated contrast agent (Imeron 400; Bracco S.p.A., Milan, Italy), metallic micro- and nanoparticles, micro- and nano-sized gas bubbles, or fluorescent dyes could be used as a contrast agent.

Preferably the method further comprises the step of providing the phantom with a region simulating the presence of a tumor; and the assessment is carried out by analyzing an amount of the tumor removed from the phantom, in particular by comparing an amount of the tumor removed in comparison to an amount of tissue without tumor that was removed, and/or by comparing an amount of tumor that remains in the phantom and/or by analyzing an amount of non-tumorous tissue that is removed from the phantom.

These are ideal assessment steps that can be conducted during the surgical training of the test subject.

According to yet a further aspect of the invention there is provided a method of assessing the performance of a human or robot carrying out a medical procedure by using a phantom resembling a human or animal organ or tissue, the method comprising the steps of:

providing the phantom with a target region, simulating a tumor, a kidney stone, a bone fragment, a bullet or a bullet or knife wound;

carrying out a diagnostic procedure with a medical imaging device to determine the position and/or extent of the target region; and assessing, from a comparison of the diagnostic result with the known size and position of the target region, a performance of the person or robot.

This kind of method could then be used to analyze the diagnostic skills of a test subject. For example, the test subject should be able to differentiate between e.g. a tumor and a medical implant in the medical images. This is vital in the training of e.g. radiologists, as based on their findings a treatment plan of a human or animal is typically devised.

It should be noted in this regard that the medical imaging device is one of ultrasound, by MRI, by CT, by fluorescence, and/or by X-ray imaging, PET and wherein image data obtained by means of the medical imaging device is stored.

This kind of apparatus can advantageously be used in the diagnosis of various medical pathologies.

Advantageously the phantom comprises tissue having at least one property that resembles at least one property of the human or animal tissue, with said tissue comprising at least first and second regions, wherein said second region has at least one characteristic that is different from a characteristic of the first region and said at least one characteristic is configured to be visualized or imaged, with said second region comprising the target region.

It is preferred if the assessment is made by assessing the at least one characteristic of the second region, optionally by comparing the size and/or position and/or intensity of the at least one characteristic of the second region with the size and/or position and/or intensity of the at least one characteristic of the first region or with the size and/or position and/or intensity of a reference.

In this connection it should be noted that the assessment can comprise an analysis of an amount of the second region removed in the second state by comparing material removed to material left behind in the phantom on the basis of the at least one characteristic of the second region.

Likewise doping the first region to highlight whether too much of this material has been removed could be an assessment step, thus an amount of the first region removed in the second state can be assessed by assessing the at least one characteristic of the second region.

Alternatively the assessment comprises a comparison of the amount of the second region and an amount of the first region removed. If too much tissue is removed from e.g. a kidney, then the kidney's filter function can no longer be guaranteed. In contrast to this if too little tumor material is removed then the tumor will continue to grow and the patient will not have been treated to a sufficient degree.

Figures 5, 6:
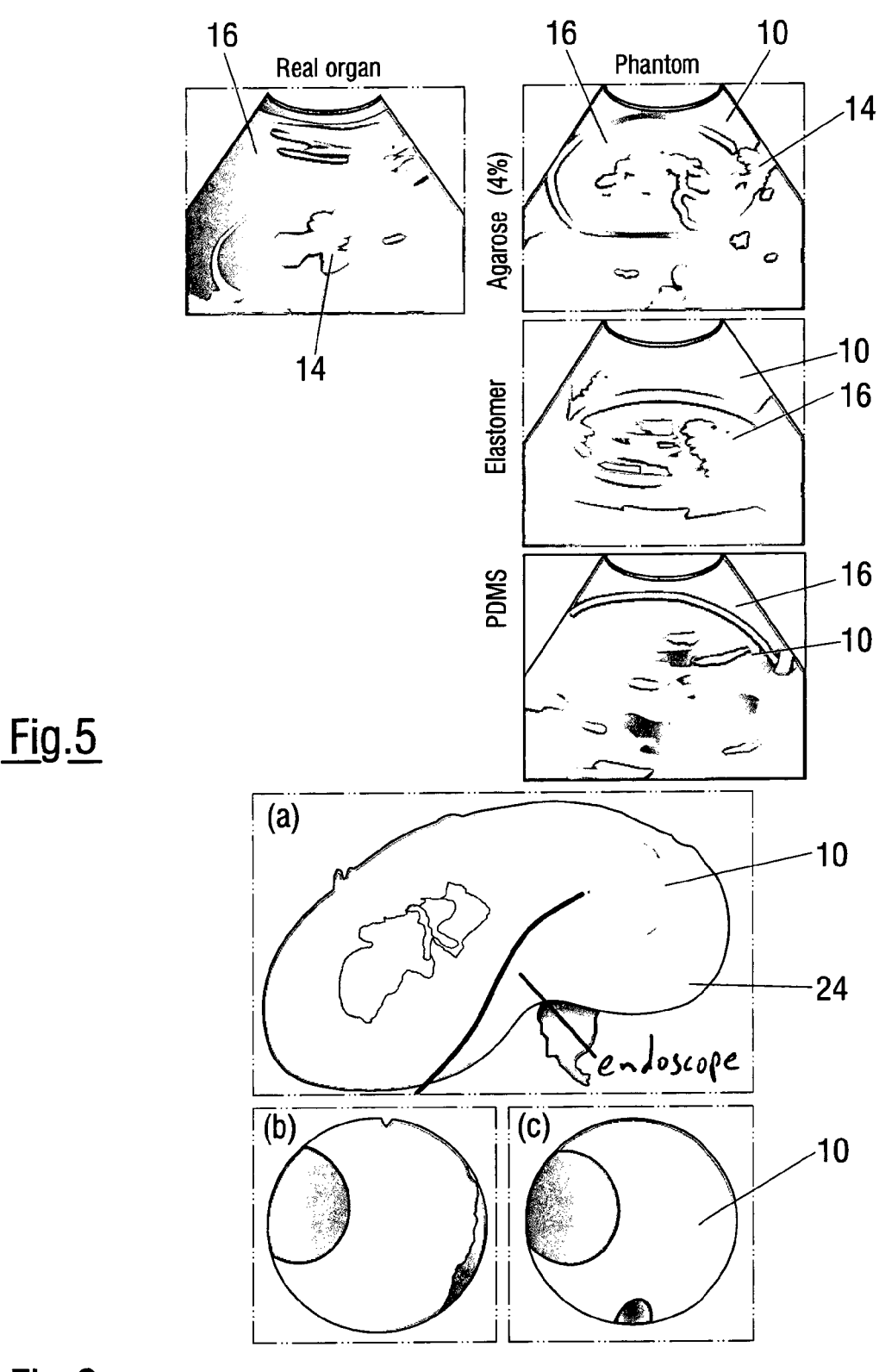
Figures 11, 12:
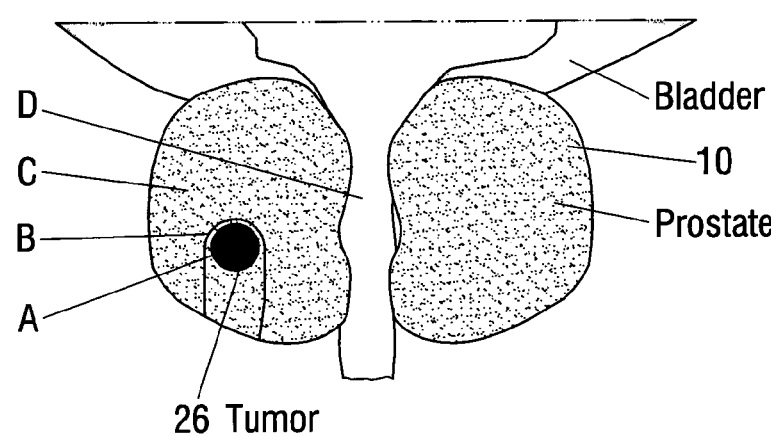
Figure 13:
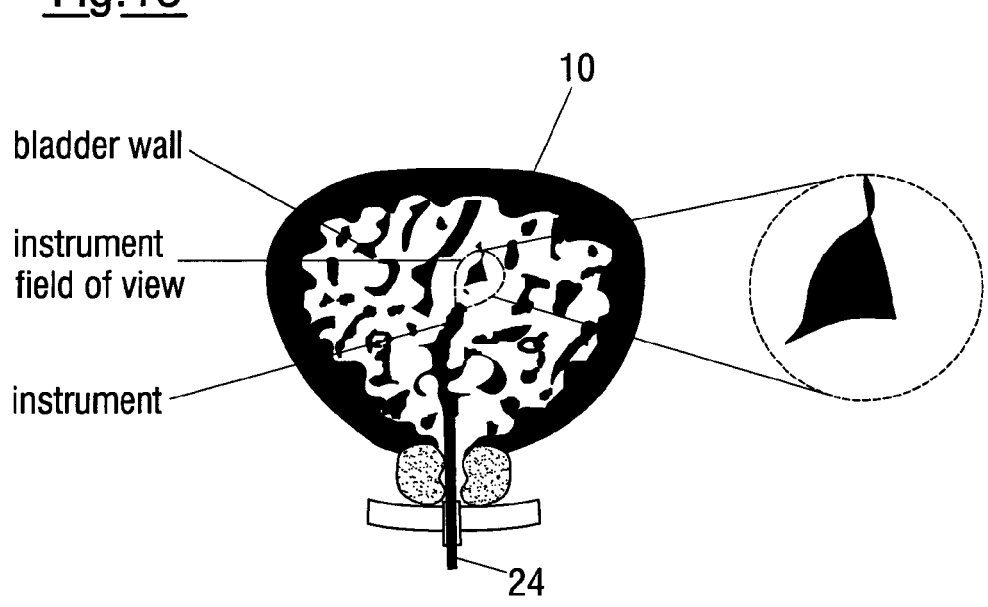
Figure 14:
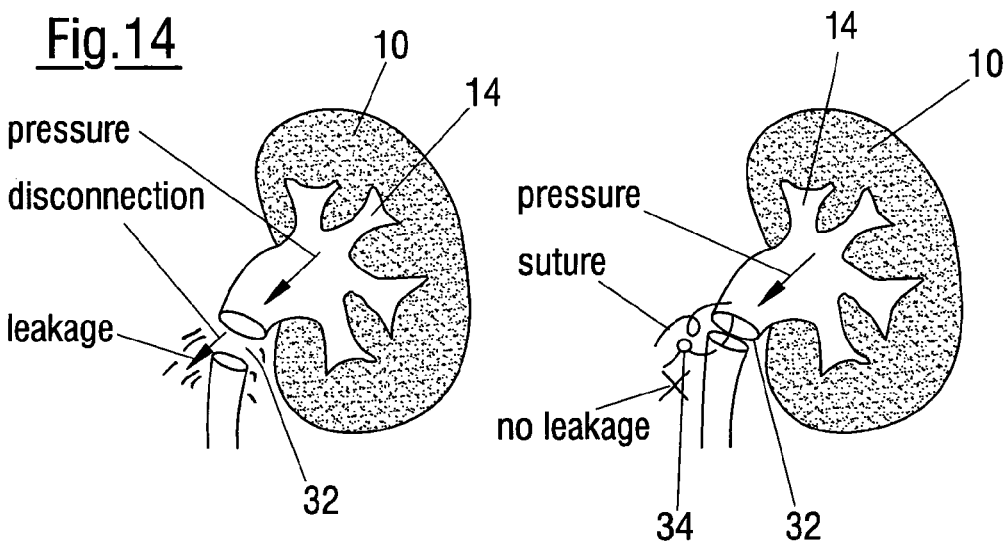

Further embodiments of the invention are described in the following description of the Figures. The invention will be explained in the following in detail by means of embodiments and with reference to the drawing in which is shown:

FIGS. 1a to d a flow chart detailing the steps required to design a mold for an anatomically correct kidney phantom;

FIGS. 2a to f a workflow for building a 3D kidney phantom;

FIGS. 3a to c respective images of the kidney phantoms made of different kinds of materials (front and back side);

FIGS. 4a to c steps carried out to evaluate the accuracy of the phantom structure;

FIGS. 5a to d ultrasound images of the three models made of different kinds of materials in comparison to a real human kidney;

FIGS. 6a to c images showing a response behavior of the kidney when an endoscope is inserted therein;

FIGS. 7a to c a flow chart showing the steps required to embed a tumor and a kidney stone in the kidney model;

FIGS. 8a to c images showing the removal of a renal tumor from the soft kidney phantom;

FIGS. 9a to e schematic images of a glove mold method;

FIGS. 10a to d images of steps carried out in the glove mold method;

FIG. 11 a further kind of phantom comprising a transition region between a first region and a second region;

FIG. 12 a further kind of phantom;

FIG. 13 a view of an endoscopic procedure being conducted on a bladder phantom; and FIG. 14 a further view of a kidney phantom subjected to a surgical procedure.

In the following the same reference numerals will be used for parts having the same or equivalent function. Any statements made having regard to the direction of a component are made relative to the position shown in the drawing and can naturally vary in the actual position of application.

Figure 2:
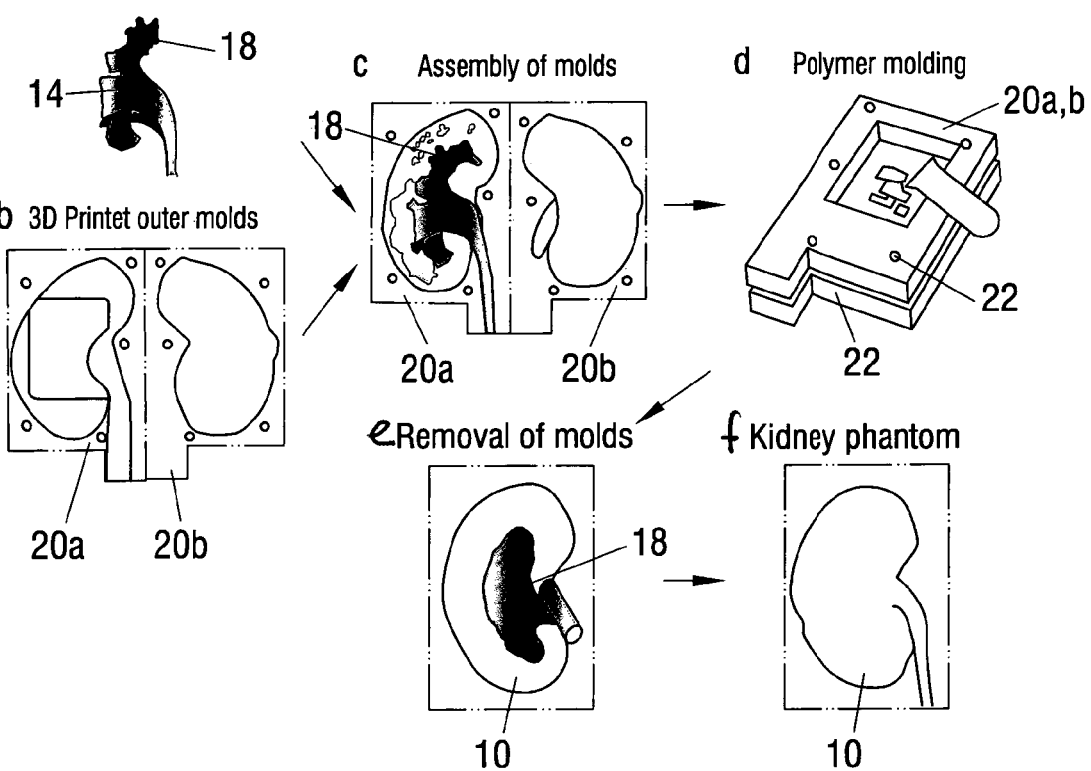

FIG. 1 shows a flow chart detailing the steps required to design a mold for an anatomically correct kidney phantom 10 (see FIG. 2). In a first step an X-ray computed tomography (CT) image 12 of a human kidney was taken (see FIG. 1a). In order to do this an iodinated contrast agent (iodine concentration of 400 mg/ml; Imeron 400; Bracco S.p.A., Milan, Italy) was injected into a collecting system of the kidney via a silicone tube connected to the ureter (all not shown). Thereafter, the cadaveric kidney was scanned using a CT scanner 8 (see FIG. 4a) (Somatom Definition Flash; Siemens Healthcare, Forchheim, Germany) with a spatial resolution of 0.3 mm. The data was reconstructed out of the axial plane with a matrix size of 512×512, and a field of view of 154 mm×154 mm. The data obtained on scanning can be stored in so-called DICOM files. These files can then be used in order to analyze the different scans taken with the CT scanner 8.

The DICOM files obtained from the CT scan were subsequently imported into computer program having the name InVesalius 3.0.0 (currently available on http://www.cti.gov.br/invesalius/). As shown in FIG. 1a, the kidney has two distinct regions, the collecting system 14 and the surrounding tissue 16. These two regions 14, 16 can easily be distinguished from one another in the CT scans due to the large contrast between the different materials of these parts of the kidney. The collecting system 14 in the center appears different in color from the kidney tissue 16 because of the concentrated contrast agent, with the background being shown in black. The data from these two regions 14, 16 of the kidney was separated in order to calculate and construct an inner mold or insert 18 (FIG. 1c) and an outer mold 20a, b (FIG. 1d) respectively for the kidney phantom 10. The surfaces for each part were exported as so-called STL files respectively, as shown in green and red in FIG. 1b.

FIG. 1c shows the insert 18 which is an anatomically correct mold of the collecting system 14 for the kidney phantom 10. In contrast to this FIG. 1*d* shows a mold 20*a, b* for an outer shape of the kidney phantom 10. This is split into two negative molds 20*a, b* that are separated in the middle. In order to obtain anatomically correct molds 20*a, b* and an anatomically correct insert 18, these were modelled using the software program Inventor 2016 (Autodesk, US). In order to produce the molds the DICOM files respectively the exported STL files were used as a starting point in Inventor 2016.

In order to produce an anatomically correct 3D kidney phantom 10, the following steps were carried out as shown in FIG. 2. The insert 18 forming the collecting system 14 was printed using an engineered wax (Solidscape® build material, this material is a mixture and the exact chemical composition is a trade secret of the company) on a 3D printer (3Z Pro, Solidscape®). The supporting wax (Solidscape® support material) was removed with petroleum at 55° C. with continuous magnetic stirring on a hot plate (not shown). The resultant insert 18 can be seen in FIG. 2*a*.

The outer molds 20*a, b* were printed with a UV curable polymer VeroClear® on a 3D printer (Objet 260 Connex, Stratasys, Israel). The supporting material was removed by pressurized water jet. The respective printed halves of the outer mold 20*a, b* are shown in FIG. 2*b*. Following this the inner mold 18 was arranged in one of the two halves of the outer mold 20*a* (see FIG. 2*c*) and then the other half of the outer mold 20*b* was placed onto the first half of the mold 20*a* with a gasket arranged between the two halves of the mold 20*a, b* which are subsequently combined and sealed off using screws 22 to form the complete outer mold 20*a, b* as shown in FIG. 2*d*.

In order to form the kidney phantom 10 a silicone elastomer material (EcoFlex®, Smooth-on Inc., US) was mixed 1A:1B by weight on a digital balance, thoroughly mixed, degassed for 10 min, poured into the assembled mold and degassed for 30 min again in a vacuum oven. The polymer was cured at room temperature, and then it was carefully demolded from the mold 20*a, b*.

FIG. 2*e* shows the polymeric kidney phantom 10 removed from the outer mold 20*a, b*. The insert 18 is still present within the kidney phantom 10.

The insert 18 is subsequently removed by dissolving the wax in ethanol with a continuous magnetic stirring at 70° C. to form the kidney phantom 10 as shown in FIG. 2*f*. The obtained kidney phantom 10 can be attached to a silicone tube at the pelvis to mimic the ureter (not shown).

It is preferable if the material used to form the insert used in forming the collecting system 14 by way of the mold 18 has different physical or chemical properties or characteristics in comparison to the material used to form the tissue 16 in the mold 20*a, b*.

These different physical or chemical characteristics allow the selective removal of the material of the insert used to form the collecting system 14 while preserving the material of the tissue 16. These characteristics can be a difference in the solubility, or the melting point, or the difference in reactivity between the materials. For example, the material of the insert 18 forming the collecting system 14 is not water soluble (e.g. wax), whereas the material for the tissue 16 is water soluble (e.g. agarose). This means that water soluble materials, such as agarose, can be used to form the bulk tissue of the proposed phantom 10. This is because the insert 18 can be removed on the application of heat without the use of a solvent. This was previously not known.

In particular the material used to form the tissue 16 of the kidney phantom 10 is chosen to reproduce a property of the tissue of the real organ, such as a mechanical property, an imaging contrast in MRI, CT, or Ultrasound, an optical property or visual appearance, the tissue's or organ's absorbance of electromagnetic radiation, or a tissue's or organ's absorbance of acoustic waves, or a haptic property of the tissue or organ.

Moreover, the material used to form the tissue 16 can include a mixture that forms a homogenous or an inhomogeneous mixture that reproduces further features of the tissue 16 of the real organ, e.g. absorbance, scattering of electromagnetic radiation or acoustic waves, or its visual appearance.

In order to form a kidney phantom 10 various materials can be considered, the following none conclusive list shows exemplary materials.

1) Water based gels: agarose, gelatin, collagen, elastin, PEG (Polyethylene glycol), These are the most important materials, because they have many similar properties in comparison to human soft tissues. These are also the materials that cannot be used together with the 3D printed PVA (Polyvinylalkohol) material reported in the prior art.

2) Silicone based polymers: PDMS (Polydimethylsiloxane), EcoFlex®, Dragon skin®

3) A mixture of several materials, such as mixing nanofibers, nanoparticles, protein or fat granules inside the water based gel to achieve tissue-like properties.

If the kidney phantom 10 is used as a surgical training tool, then a pigment or colorant can be added to the material that forms the tissue 16 in order to mimic the color of the real organ in the kidney phantom 10.

In order to test different materials the kidney phantom 10 was produced using three different kinds of materials. FIG. 3*a* shows a kidney phantom 10 made from a tissue-like silicone elastomer, FIG. 3*b* shows a kidney phantom 10 made from PDMS and FIG. 3*c* shows a kidney phantom 10 made from agarose (4%).

The respective outer shapes of the kidney phantom 10 shown in FIGS. 3*a* to *c* match that of the 3D reconstructed model. In order to confirm that the interior structure of the kidney phantom 10 indeed replicates the real kidney, a second CT scan was performed on the kidney phantom 10 with the same parameters as the real kidney. To this end FIG. 4*a* shows a photograph of the kidney phantom 10 prior to being inserted into the CT scanner 8. From a radiological point of view both the renal pelvis and all calyces corresponded to the respective structures of the CT image 12 of the cadaveric kidney as shown in FIG. 1*a*. Moreover, the CT reconstruction showed that the molding process successfully reproduced morphological details of the collecting system 14 down to sub-millimeter structures. The resolution achieved was limited by the resolution of the original CT scan. From the reconstruction of the 3D model, it is clear that the inner and outer surfaces of the model closely represent those of the original organ. This is shown in FIG. 4*b*.

FIG. 4*c* shows a quantitative error analysis of the collecting system in the phantom, comparing with the original CT scan. In order to quantitatively assess the difference between the real organ and the kidney phantom 10 a quantitative comparison was carried out using the STL files obtained for both the real kidney and the kidney phantom 10. This comparison was conducted using the software CloudCompare v2.6.1 (currently obtainable at http://www.daniel-gm.net/cc/).

Two separate meshes were defined in the STL files, i.e. a mesh of the phantom and a mesh of the real organ. These two meshes were then manually aligned by selecting three marker points in each mesh (typically at the tip positions of the kidney/kidney phantom 10). After the definition of each of the three marker points the software overlays the scans of the real organ and of the phantom, such that a so-called a Cloud/Cloud distance can be computed for the two vortices with an Octree level that equals 6, with the Octree level being definable in the CloudCompare software. The thereby obtained distribution of the error in distance of the elastomer model is displayed in the legend depicted in FIG. 4c.

The results show a maximum error of 2 mm with respect to a comparison of the medical imaging data used to construct the insert 18 forming the collecting system 14. The mean error over the total collecting system 14 (with a bounding box dimension of approximately 7 cm [length]×4 cm [width]×3 cm [height]) is 0.5 mm (FIG. 4c). Thus, the mean error of the model is about 1%, which is suitable for endoscopic training and testing purpose. The reconstruction and comparison of the other two materials show similar precision with about 0.5 mm mean distance error.

Likewise an average root mean square error of the tissue 16 formed in the mold 20a, b is less than 5 mm when compared to the medical imaging data used to design the mold 20a, b.

In order to test the performance of materials used to form the kidney phantom 10, ultrasound images of the three different kinds of kidney phantoms 10 were compared with a real human kidney (shown in FIG. 5A). The ultrasound image relating to the agarose model shown in FIG. 5B shows that the structures of the collecting system 14 and of the kidney tissue 16 can be recognized more clearly than those of the kidney phantom 10 made from silicone elastomer (FIG. 5C) and also those of the kidney phantom 10 made from PDMS (see FIG. 5D). Surprisingly the collecting system 14 and the tissue 16 of the agarose kidney phantom 10 can also be more clearly recognized than those of the real organ (FIG. 5A). This difference can be explained by the differences in the elasticity of the materials used for the can be tracked by eye is useful for a surgeon training to conduct such medical procedures on a kidney phantom, as he can, on the one hand, see how the endoscope 24 reacts when he initiates a movement thereof. On the other hand, he can directly compare the behavior of different endoscopes (not shown) when examining one and the same kidney phantom 10. In this way the kidney phantom 10 can form part of an assessment tool used in the training of medical personnel.

The major advantage of this work, when compared to current urological teaching and training systems and other previously reported 3D printed kidney models, is that the present method of manufacture permits a wider variety of materials to be used. The reported elastic modulus for porcine kidney is 48.56±7.32 kPa. To this end table 1 summarizes the materials properties of the three molding polymers used to build the three different kinds of kidney phantoms 10 discussed herein compared to the 3D-printable material TangoBlackPlus® (Stratasys, Eden Prairie, MN, USA).

It was found that the elastic modulus of TangoBlackPlus® was approximately 20 times higher than that of real kidney tissue. In addition, the material was completely opaque. The silicone rubber elastomer had an elastic modulus of 60 kPa, which was very close to that of real kidney tissue. PDMS (Sylgard 184, Dow Corning) is a popular polymer that shows excellent optical transparency. This facilitates a clear visualization of the collecting system 14 inside the kidney from outside, which could also be valuable for medical education and endoscopic training. However, the elastic modulus of PDMS is much larger than that of real kidney tissues. Agarose gel is a polysaccharide polymer material that is easy-to-prepare and biocompatible, thus it has been widely used as a material to mimic soft tissues for magnetic resonance imaging (MRI) and ultrasound imaging.

Table 1 shows a comparison of the mechanical properties of the three polymers used to replicate kidney tissue, as well as, TangoBlackPlus® (a directly 3D printable material).

| Materials | Kidney tissue | Elastomer | Agarose gel (4%) | PDMS | TangoBlackPlus ® |
|---|---|---|---|---|---|
| Shore hardness | — | 20 (type 00) | 60~70 (type 00) | 44~54 (type A) | 26~28 (type A) |
| Elastic modulus (kPa) | 49 | 60 | 49 | 1320~2970 | 965~1051 |
| Tensile strength (MPa) | 4~9 | 1.1 | 0.3~0.5 | 3.51~7.65 | 0.8~1.5 | various kidney phantoms 10, the models made of silicone elastomer and PDMS displayed a strong signal at the outer surface, however, only a white outline of the phantom 10 can be seen.

Furthermore, an endoscopic assessment was performed using a conventional flexible ureterorenoscope. On the inside of each kidney phantom 10, a smooth surface that represents the typical morphological characteristics of the upper urinary tract was visualized endoscopically (FIGS. 6a to c). The complete collecting system 14 appeared visually identical to a human kidney. All calyxes were easily intubated with the 10-French flexible ureterorenoscope. The spatial orientation of the instrument was clear at all times.

FIG. 6a shows a view of an endoscope 24 positioned inside the transparent kidney phantom 10. FIG. 6b shows an endoscopic view of an upper calyx in the human kidney and FIG. 6c shows the same endoscopic view in the kidney phantom 10. The fact that the position of the endoscope 24

Thus, depending on the application of the kidney phantom 10 a different kind of material of the kidney phantom 10 can be made available. For example if the kidney phantom 10 is to be used for imaging purposes a phantom made of Agarose gel would be a good choice. In contrast to this if a surgical evaluation of the kidney phantom 10 is to be performed a kidney phantom 10 made from an elastomer or PDMS may be the better choice due to the tensile strength of these materials.

In order to form a kidney phantom 10 that can be used to train medical personnel in the removal or detection of e.g. a tumor or a stone from a kidney a second feature 26 could be embedded into the kidney phantom 10.

In spite of the hollow collecting system 14 in the kidney, other anatomical important structures can be also embedded with the same molding method. FIGS. 7a to 7c show the schematic of the workflow of embedding a tumor 26 and a kidney stone 27 in the kidney phantom 10.

The kidney stone 27 is incorporated in the phantom 10 by including a material mimicking a real kidney stone in the collecting system 14 formed by the insert 18 during the fabrication process of the insert 18. Alternatively a cavity could be provided in the insert 18 on a manufacture thereof and this cavity could subsequently be filled with the material mimicking a real kidney stone. In such a way a larger sized stone can be placed within the calyx with a small opening to the collecting system 14 and can then be used in the surgical procedures associated with the removal of a kidney stone, e.g. by means of lithotripsy.

First, two features, i.e. the collecting system 14 and the tumor 26 were prepared respectively as shown in FIG. 7*a*. The tumor 26 was made by molding PDMS material in a separate 3D printed mold. An important anatomical detail about the common renal tumor is that it is neither in contact with the outer surface of the kidney, nor in contact with the collecting system 14. In other words, the tumor 26 should be fully surrounded with normal tissue 16. In order to reproduce this anatomy, the tumor 26 is inserted into a further 3D printed negative mold (not shown), which has the same shape as part of the final outer mold 20*a, b*. Thus a tumor insert 28 comprising the tumor 26 that is encased by tissue 16 is formed in the negative mold for the tumor insert 28. This tumor insert 28 has an outer contour that fits exactly in shape with part of the outer shape of the final mold 20*a, b*.

After assembling the collecting system 14 and the tumor insert 28 comprising the tumor 26 in the final outer mold 20*a, b* (FIG. 7*b*), the mold is filled with liquid polymer to form the tissue 16. When the polymer solidifies, it will connect as one whole piece with the same material of the tissue 16 surrounding the tumor 26 formed in the further mold 28 (FIG. 7*c*).

Figure 8:
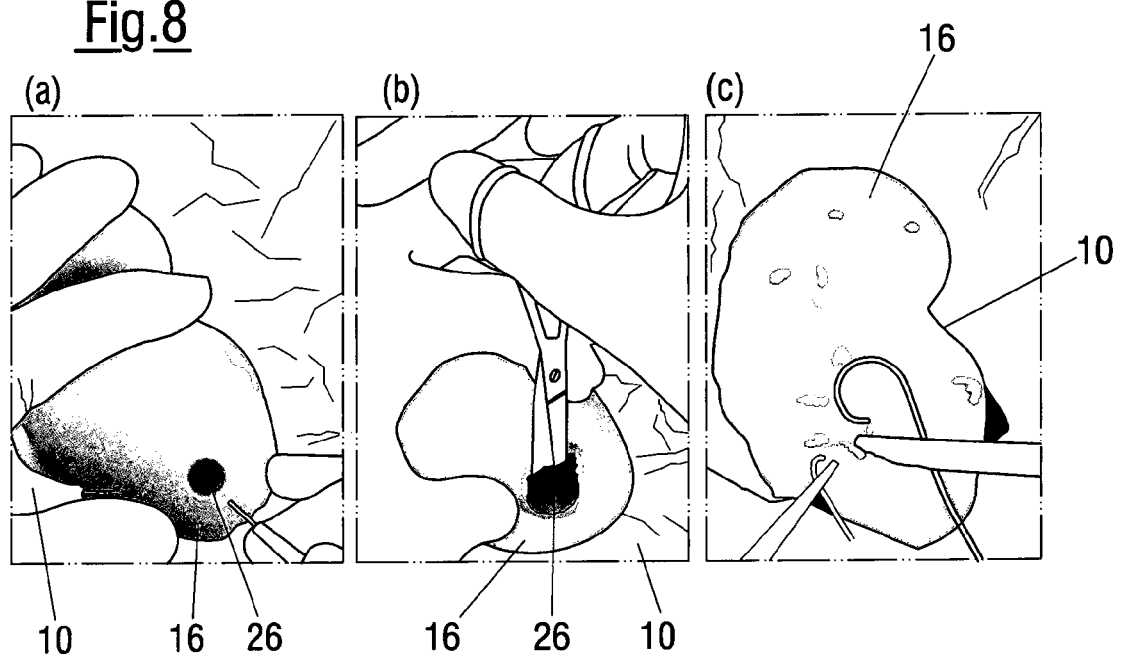

In this way, the tumor 26 can be inserted at any exact pre-defined "suspended" position inside the kidney phantom 10. One important application of the constructed kidney phantom 10 having a tumor 26 is illustrated in FIG. 8, as a training model for tumor removal using open or laparoscopic surgery techniques.

Moreover, knowing the precise position in advance means that the kidney phantom 10 having a tumor 26 can be used to calibrate imaging devices, such as MRI, CT scanner 8, X-ray, and Ultrasound and/or to assess a medical personnel operating such an imaging device.

Similar methods can also be used to embed other important anatomies, such as blood vessels and nerves into a kidney phantom 10.

FIGS. 8*a* to *c* show images showing the removal of a simulated renal tumor 26 from the soft kidney phantom 10. FIG. 8*a* in this regard shows the cutting of tissue 16 in order to access the simulated renal tumor 26. Following the access to the tumor 26 it can be exposed and removed as seen in FIG. 8*b*. Thereafter the kidney phantom 10 can be repaired by suturing as is shown in FIG. 8*c*.

In order to now assess whether medical personnel has removed the correct amount of tumor 26 from the kidney phantom 10, the tumor 26 and/or the kidney phantom 10 can respectively comprise some form of contrast agent that indicates the presence of the tumor 26.

The contrast agent could, for example, be a phosphorescent kind of material that glows in the dark so a quick comparison of the material removed with that left behind in the kidney phantom 10 by turning off a light indicates whether sufficient tumor material has been removed.

In other instances the contrast agent can comprise materials sensitive to UV light, so a black light could be used to assess the presence of any tumor remnants in the phantom 10 and hence the performance of medical personnel carrying out a performance test.

In other instances materials that can be imaged particularly well using one of CT, MRI and Ultrasound could be embedded in the kidney phantom 10 and/or the tumor 26 such that one of these imaging techniques could be used to analyze and assess the performance of someone removing the tumor 26 from the kidney phantom 10.

In yet other instances two contrast agents can be embedded for different imaging modalities, e.g. the combinations of CT, MRI, PET, Ultrasound, x-ray and/or fluorescence; and/or two contrast agents can be embedded for the same imaging modality but for different imaging sequences, e.g. for an intensity sequence and a pulse sequence in MRI.

In any event one can also dope the material of the tissue 16 with a contrast agent or like material that can be visualized to see if too much or too little tissue has been removed from the kidney phantom 10. In this way a medical personnel training with the kidney phantom 10 can be given direct feedback about whether the medical procedure which removed the tumor 26 also removed too much or too little tissue surrounding the tumor cite.

In a similar way the comparison can also see how much tissue was removed in order to see if a sufficient amount of tumor 26 was removed from the kidney phantom 10.

In this way one can also assess the performance of a human or robot carrying out a medical imaging procedure by using a phantom resembling a human or animal organ or tissue. In this case the kidney phantom 10 can be provided with a target region, simulating a tumor, a kidney stone, a bone fragment, a bullet or a bullet or knife wound at a pre-defined position with a pre-defined size. Thereafter a diagnostic procedure is carried out to determine the position and/or extent of the target region. The assessment is then carried out by comparing the diagnostic result with the known size and position of the target region. In this connection it should be noted that the diagnostic procedure is one of ultrasound, by MRI, by CT and/or by X-ray imaging, PET.

Rather than including a tumor 26 in the kidney phantom other structures could additionally be included in the kidney phantom 10. These can be selected from the group of members comprising e.g. a cavity, at least one blood vessel, at least one nerve, a kidney stone, a prosthesis or a medical implant.

In order to produce the insert 18, a so-called glove mold process can be used for a mass production of the kidney phantom 10, i.e. of an anatomical structure.

The glove mold process works as an alternative for the 3D wax printing method to make the positive plug 18*a* (insert) of the collecting system 14. As the wax 3D printing is time-consuming and expensive. FIG. 9 illustrates the workflow of this method. First, a positive plug 18*a* is obtained by 3D printing a UV curable polymer (see FIG. 9*a* and FIG. 10*a*), which is a hard plastic material and does not easily dissolve in solvent or melt with temperature as the wax materials mentioned above do. Then, 3 to 5 layers of a glove mold material 30 are applied to the positive plug 18*a*, in the present instance is brushed onto the positive plug 18*a* as shown in FIG. 9*b*.

Once the glove mold material 30 is cured, the glove mold 30 can be peeled off as it is soft and stretchy as shown in FIGS. 9*c* and 10*b* respectively. This glove mold 30 can then serve repeatedly as a mold for the insert 18 forming the collecting system 14 of a kidney phantom 10 as shown in FIG. 9*d*. This glove mold 30 can be used to mold the collecting system 14 using materials, such as paraffin and gelatin as shown in FIGS. 10c and 10d respectively. In this way multiple anatomical features can be replicated precisely, fast and cost-effectively as is schematically indicated in FIG. 9e by the plurality of inserts 18.

Figure 7:
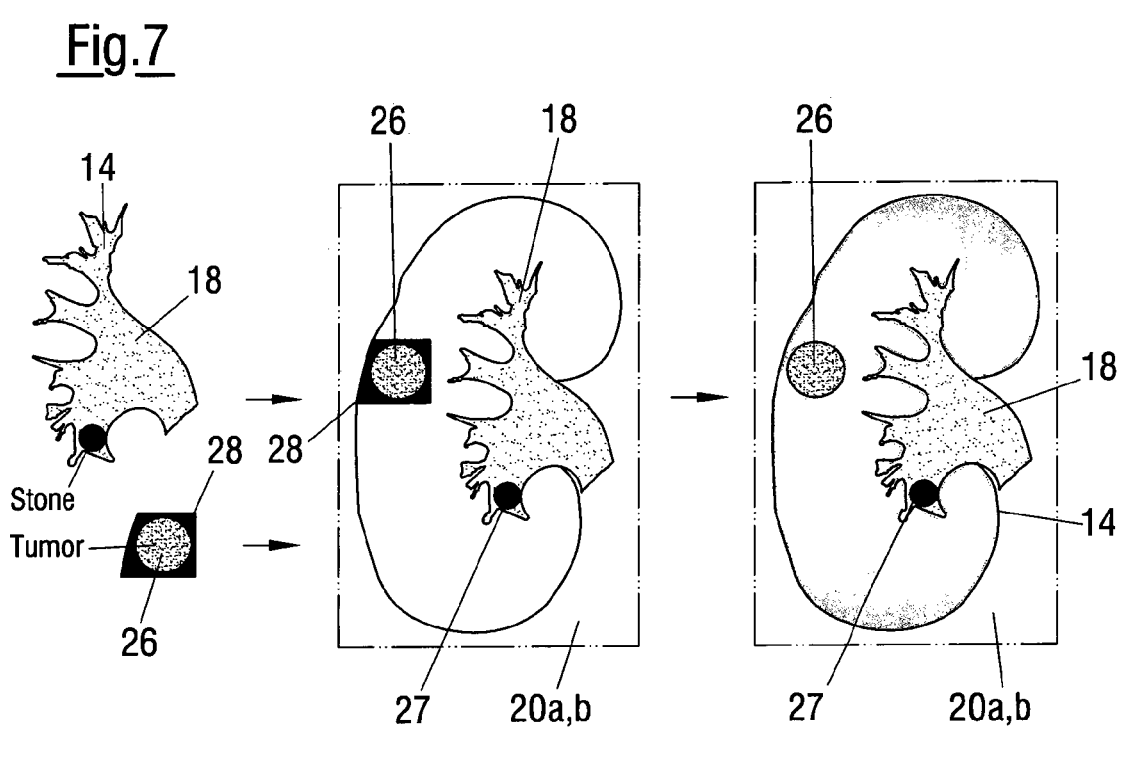

The glove mold method can also be used to make other anatomical structures, such as the tumor 26 mentioned above. However, the restriction to this method is that the molded shape cannot contain any closed loop, thus it will not be a suitable method for structures such as blood vessels and nerves. The glove mold method can also be used to make one part of the phantom (e.g. the collecting system 14), which can then be assembled with other parts that are made by other techniques (e.g. 3D printing of the blood vessels) in order to mold the final kidney phantom 10 with multiple anatomical features (similar to what is shown in FIG. 7), in order to produce even more sophisticated kidney phantoms 10. These can then be connected to fluid conveying devices to mimic the flow of blood and possibly of other liquids. In use of these sophisticated kidney phantoms 10, a surgeon is given direct feedback on whether he or she cut e.g. a blood vessel of the kidney phantom 10 or not.

The foregoing description relates to a kidney phantom 10. However, it should be noted that phantoms of various other organs could be produced and used for training purposes. These animal or human organ phantoms include, but are not limited to the liver, the intestine, the prostate, the lungs, the brain and the heart, blood vessel, pancreas, gall bladder, GI tract, urinary tract, testicle, penis, female reproductive tract, breast, and an ear. The surgery at all of these organs is conducted by highly skilled medical staff and the production of comparatively cheap phantom organs makes available a comparatively low cost training and assessment tool that can be used in training the medical personnel.

Having regard to e.g. a prostate, a bladder or a heart phantom, part of the phantom can include a pump or material forming a pump to mimic the behavior of the real organ in an improved way during a training exercise.

Moreover, the material of the tissue of the phantom used has an elastic modulus that corresponds to the organ's elastic modulus of the corresponding tissue found in the organ.

It should also be noted that sensors (not shown) could be incorporated into the phantom 10 described herein. These sensors could include physiological markers embedded within the phantom 10. Using these sensors, signals, such as the blood flow/pressure, fluidic flow, tissue intactness, tumor removal rate etc., could be evaluated from the phantom 10. This evaluation could be done in real time through the use of the sensors or offline in a CT scanner 8 or an MRI device etc.

In this regard it should be noted that if a liquid or fluid is conducted through one or a plurality of cavities provided in the phantom 10, then the presence (leaking) of that fluid could be used as a real time sensor signal to indicate that something has gone wrong during the surgery on the phantom 10.

Likewise sensors could be embedded in parts of the phantom resembling nerves and on cutting these nerves an audible sound could be emitted to indicate that nerves have been severed or punctured.

FIG. 11 shows a further kind of kidney phantom 10 comprising a transition region B that surrounds a second region A that can, for example, be a tumor. This transition region B separates the tumor A from the normal tissue C present within the phantom 10. In this way a structure forming the tumor A can be introduced into the tissue-like material with the transition zone B present at the interface between the first and second regions A and C. This transition zone can comprise a mixture of the respective materials of the first and second regions A and C. Alternatively this transition zone B can also comprise different material properties from those of regions A and C and provision can then for example be made that only this transition zone comprises the material that can be visualized as a successful completion of the surgical exercise could be the complete removal of this transition zone B.

FIG. 12 shows a further kind of phantom 10, namely a phantom of a prostate. Like the phantom 10 depicted in FIG. 11, a further structure, e.g. a tumor, is inserted in a region marked A. This structure is surrounded by a region comprising material B and can be embedded in a first region comprising material C.

Both of the phantoms 10 of FIGS. 11 and 12 can also comprise further regions D that can model structures of the specific organ. In FIG. 11 region D corresponds to a collecting system 14 of a kidney, whereas in FIG. 12 region D corresponds to a urethra.

In some cases, the target of the medical procedure is to completely remove the region A, maintain the maximum volume of region B and absolutely no removal of region C (according to the kidney tumor removal of FIG. 11). In other cases the target could be the removal of both regions A and B while maintained region C.

It should further be noted that if one of the respective phantoms 10 shown in FIGS. 11 and 12 are used for the assessment of a medical procedure, then the medical procedure can be the removal of tissue for the purpose of a biopsy. The aim being the removal of a small amount of only material A. Depending on the assessment criteria the removal of only material A could lead to a positive assessment, whereas the removal of only material C could lead to a negative assessment etc.

It should be noted that where reference is made to a tumor in the foregoing, the second structure 26; A, B introduced into the phantom 10 could also replicate diseased tissue and/or an anomalous structure present in the organ and as such may either be partly removed for the purpose of biopsy, i.e. a diagnostic purpose, or completely removed by means of a medical procedure.

It should also be noted that the phantom 10 is provided to allow a medical professional or a robot to practice cutting techniques on a simulated organ rather than on a real organ which are hard to come by and hence expensive. These different cutting techniques can range from simple cutting and suturing practice for medical students to practicing biopsies at regions hard to reach and or tumor removal at sensitive positions. Generally speaking these hard to reach positions cannot be simulated using real organs as these are generally very specific cases of application.

FIG. 13 shows a view of an endoscopic procedure being conducted on a bladder phantom 10, with an enlarged field of view of the endoscope 24 being shown in the circle. By moving the endoscope 24 at the point of assessment an approximately 360° view of the point of assessment can be obtained for the endoscope 24 in question.

The assessment of the medical procedure can then be a measurement of the viewing field scanned by the medical personnel or robot. In order to do this the phantom 10 may further comprise an optical pattern embedded therein, more specifically embedded in the target region 26. This optical pattern then conveys information relating to the position and size of the target region. This information is either optically invisible to the endoscope 24 or cannot be interpreted by the operator, but can be analyzed using specific filters in software provided for the assessment of the medical procedure. On reviewing this information a surface area of any scan taken can be made and compared to a surface area that is obtainable by that specific device. In this way one can assess if the medical personnel or robot has detected the complete target region respectively a surface area thereof or not.

In this way a further assessment parameter is the completeness (surface area coverage) with which for instance an imaging or inspection has been performed.

For instance in bladder cystoscopy (inspection) it is important that, during an endoscopic cystoscopic procedure, the entire inside of a bladder is inspected and that no region is missed, as this could for instance mean that the inspection misses a tumor.

FIG. 14 shows a further view of a kidney phantom 10 subjected to a surgical procedure. On conducting the medical procedure the ureter is severed at a point of severance 32. This point of severance 32 needs to be repaired in order to repair the kidney phantom 10. This repair is conducted by suturing the ureter using a suture 34. The quality of this suture 34 can then also be assessed as part of the review of the medical procedure. This can for example be done by: a measurement of a mechanical strength of the suture, and a subsequent comparison with a target value; a measurement of the pressure of the phantom after the intervention, possibly by a comparison of pressure before and after, and a comparison with a target value; a measurement of the elasticity of an implant or a connection; a measurement of an electrical connection in case of a simulated neuronal connection; and a test to see if an implant or device embedded during the medical procedure functions correctly.

The invention claimed is:

1. A method of assessing the performance of a medical procedure by using a phantom resembling a human or animal organ or tissue, the method comprising the steps of:

providing a target region of the phantom having a first state at the start of the medical procedure;

carrying out the medical procedure to transform the target region of the phantom from the first state to a second state by removing material of the target region; and obtaining an assessment, by assessing a comparison of the first state and the second state, of the medical procedure, wherein the phantom comprises two different first and second contrast agents embedded in at least the material to be removed of the same phantom for respective first and second imaging modalities, with the first and second imaging modalities differing from one another, and with only the first imaging modality being used to detect the first contrast agent while carrying out the procedure to transform the target region from the first state to the second state, wherein, after performing the procedure, the comparison is carried out so that the material removed by the medical procedure is visualizable by detecting the second contrast agent using only the second imaging modality and the comparison is carried out by an analysis of the material removed with respect to a material that is left behind in the phantom or with reference to an evaluation standard on the basis of the second imaging modality, wherein material removed from the phantom by the medical procedure is visualized by incorporating fluorescent material in the phantom, wherein the target region further comprises an optical pattern, with the optical pattern including information regarding at least one of the position, size and illumination intensity of the target region.

2. The method in accordance with claim 1, wherein material removed from the phantom by the medical procedure is visualized by at least one of:

incorporating material visualizeable on the application of UV light into the phantom under UV light; and investigating the phantom by ultrasound, by MRI, by CT, by PET and/or by X-ray imaging.

3. The method in accordance with claim 1, wherein a scoring system for the assessment is establishable on the basis of the comparison using measured physical parameters.

4. The method in accordance with claim 3, wherein the physical parameters are selected from the group of members consisting of the time of the procedure, a blood loss, a measurement of volume/weight of material removed, mechanical strength, elasticity, resistance of an electrical connection, pressure, fluidic flow, and/or proper function of a device or implant.

5. The method in accordance with claim 1, wherein the phantom comprises tissue having at least one property that resembles at least one property of the human or animal tissue, with said tissue comprising at least first and second regions, wherein said second region has at least one characteristic that is different from a characteristic of the first region and said at least one characteristic is configured to be visualized or imaged, with said second region comprising a target region.

6. The method in accordance with claim 5, further comprising the step of providing the phantom with a third region simulating a transient region in between the first and second regions; and wherein the assessment is carried out by analyzing the size and/or position and/or intensity of the third region; or wherein the assessment is carried out by analyzing an amount of tissue removed from and/or left in the phantom; and/or by measuring how much volume and/or weight of the second and third regions are removed from the first region.

7. The method in accordance with claim 6, wherein the second region has at least one different material property in comparison to the first and third regions, with the at least one different material property of the second region being detectable during the medical procedure, with this at least one different material property being selected from the group of members consisting of a visual property of the texture, a color, an elasticity, a heat conductivity, a roughness, a haptic property, a density, a fluidic content, and combinations thereof.

8. A method of assessing the performance of a medical procedure by using a phantom resembling a human or animal organ or tissue, the method comprising the steps of:

providing the phantom with a target region to be removed having a known size and position, simulating a tumor, a stone, a bone fragment, a bullet or a bullet or knife wound;

performing the medical procedure on the target region to alter a state of the target region;

obtaining a diagnostic result by carrying out a diagnostic procedure with a medical imaging device to determine the altered state of the target region; and obtaining an assessment of the medical procedure by assessing, from a comparison of the diagnostic result with the known size and position of the target region, wherein the phantom comprises two different first and second contrast agents embedded in at least a material to be removed of the same phantom for respective first and second imaging modalities, with the first and second imaging modalities differing from one another, and with only the first imaging modality being used to detect the first contrast agent while performing the medical procedure, wherein the comparison is carried out by preparing the phantom so that the target region is visualizable using only the second imaging modality to detect the second contrast agent and the comparison is carried out by an analysis of the target region or with reference to an evaluation standard on the basis of the second imaging modality, wherein the material removed from the target region of the phantom by the medical procedure is visualized by incorporating fluorescent material in the phantom, wherein the target region further comprises an optical pattern embedded therein, with the optical pattern including information regarding at least one of the position, size and illumination intensity of the target region.

9. The method in accordance with claim 8, wherein a scoring system for the assessment is establishable on the basis of the comparison using measured physical parameters.

10. The method in accordance with claim 9, wherein the physical parameters are selected from the group of members consisting of the time of the procedure, a blood loss, a measurement of volume/weight of material removed, mechanical strength, elasticity, resistance of an electrical connection, pressure, fluidic flow, and/or proper function of a device or implant.

11. The method in accordance with claim 8, wherein the phantom comprises tissue having at least one property that resembles at least one property of the human or animal tissue, with said tissue comprising at least first and second regions, wherein said second region has at least one characteristic that is different from a characteristic of the first region and said at least one characteristic is configured to be visualized or imaged, with said second region comprising a target region.

12. The method in accordance with claim 11, wherein the assessment is made by assessing the at least one characteristic of the second region.

13. The method in accordance with claim 11, further comprising the step of providing the phantom with a third region simulating a transient region in between the first and second regions; and wherein the assessment is carried out by analyzing the size and/or position and/or intensity of the third region; or wherein the assessment is carried out by analyzing an amount of tissue removed from and/or left in the phantom; and/or by measuring how much volume and/or weight of the second and third regions are removed from the first region.

14. The method in accordance with claim 13, wherein the second region has at least one different material property in comparison to the first and third regions, with the at least one different material property of the second region being detectable during the medical procedure, with this at least one different material property being selected from the group of members consisting of a visual property of the texture, a color, an elasticity, a heat conductivity, a roughness, a haptic property, a density, a fluidic content, and combinations thereof.

* * * * *